(12) United States Patent
Seabaugh et al.

(10) Patent No.: US 6,803,138 B2
(45) Date of Patent: Oct. 12, 2004

(54) CERAMIC ELECTROLYTE COATING METHODS

(75) Inventors: Matthew M. Seabaugh, Columbus, OH (US); Scott L. Swartz, Columbus, OH (US); William J. Dawson, Dublin, OH (US); Buddy E. McCormick, Dublin, OH (US)

(73) Assignee: NexTech Materials, Ltd., Lewis Center, OH (US)

( * ) Notice: Subject to any disclaimer, the term of this patent is extended or adjusted under 35 U.S.C. 154(b) by 18 days.

(21) Appl. No.: 09/897,796

(22) Filed: Jul. 2, 2001

(65) Prior Publication Data

US 2003/0003237 A1 Jan. 2, 2003

(51) Int. Cl.$^7$ ................................................ H01M 8/10
(52) U.S. Cl. ............................ 429/30; 429/33; 429/40; 429/44; 429/45; 427/115; 427/331; 427/372.2; 427/379; 427/383.5; 427/421; 427/422; 427/427; 204/421
(58) Field of Search .......................... 427/77, 115, 331, 427/372.2, 379, 383.5, 421, 422, 427; 429/44, 45, 30, 33, 40; 204/421

(56) References Cited

U.S. PATENT DOCUMENTS

| | | | |
|---|---|---|---|
| 2,763,569 A | 9/1956 | Bradstreet et al. ............ 177/47 |
| 3,082,103 A | 3/1963 | Wainer ........................ 106/55 |
| 3,259,585 A | 7/1966 | Fitch et al. .................. 252/313 |
| 4,598,467 A | 7/1986 | Isenberg et al. ........... 29/623.5 |
| 5,030,601 A | 7/1991 | Michel et al. .............. 501/103 |
| 5,223,176 A | 6/1993 | Obitsu et al. ............. 252/313.1 |
| 5,503,771 A | 4/1996 | Staley et al. ............. 252/313.1 |
| 5,516,597 A | 5/1996 | Singh et al. .................. 429/30 |
| 5,527,633 A | 6/1996 | Kawasaki et al. ............ 429/30 |
| 5,656,387 A | 8/1997 | Barnett et al. ................ 429/33 |
| 5,709,786 A | 1/1998 | Friese et al. ................ 204/421 |
| 5,905,000 A | 5/1999 | Yadav et al. .................. 429/33 |
| 6,013,591 A * | 1/2000 | Ying et al. ..................... 501/1 |
| 6,387,560 B1 * | 5/2002 | Yadav et al. .................. 429/45 |

* cited by examiner

*Primary Examiner*—Bruce F. Bell
(74) *Attorney, Agent, or Firm*—Porter, Wright, Morris & Arthur LLP

(57) ABSTRACT

Processes for preparing aqueous suspensions of a nanoscale ceramic electrolyte material such as yttrium-stabilized zirconia. The invention also includes a process for preparing an aqueous coating slurry of a nanoscale ceramic electrolyte material. The invention further includes a process for depositing an aqueous spray coating slurry including a ceramic electrolyte material on pre-sintered, partially sintered, and unsintered ceramic substrates and products made by this process.

9 Claims, 11 Drawing Sheets

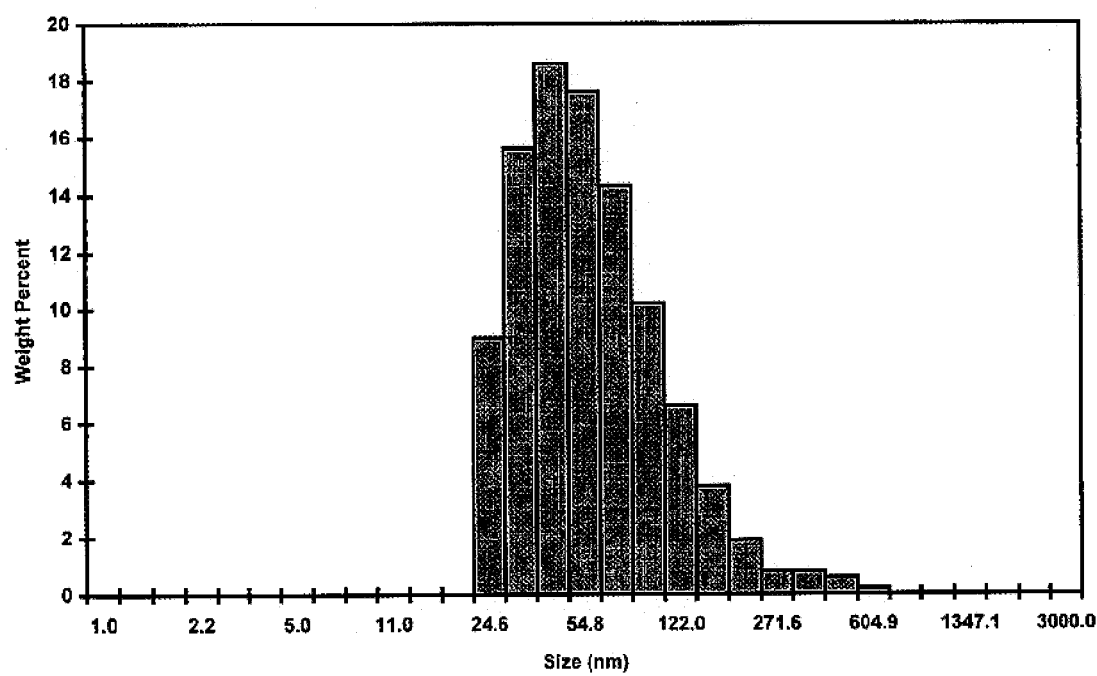
Figure 3a Chart T

Figure 5
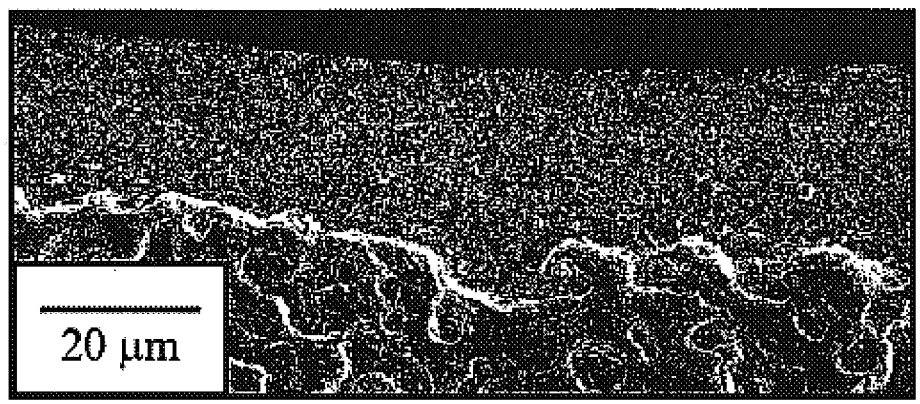
Figure 5A
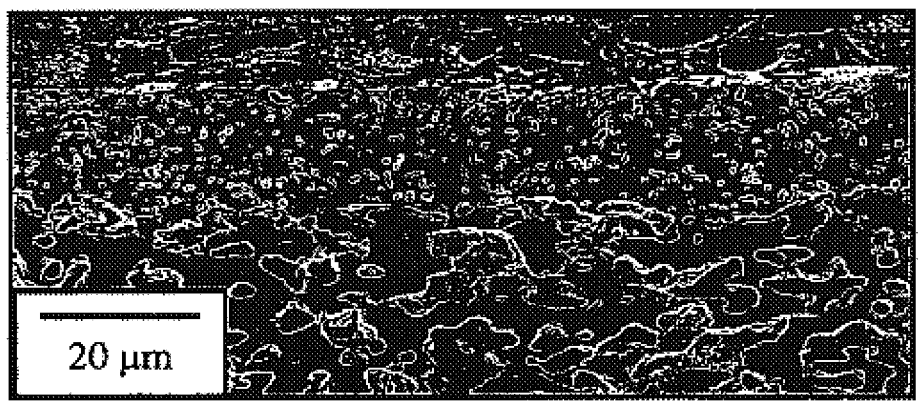
Figure 5B
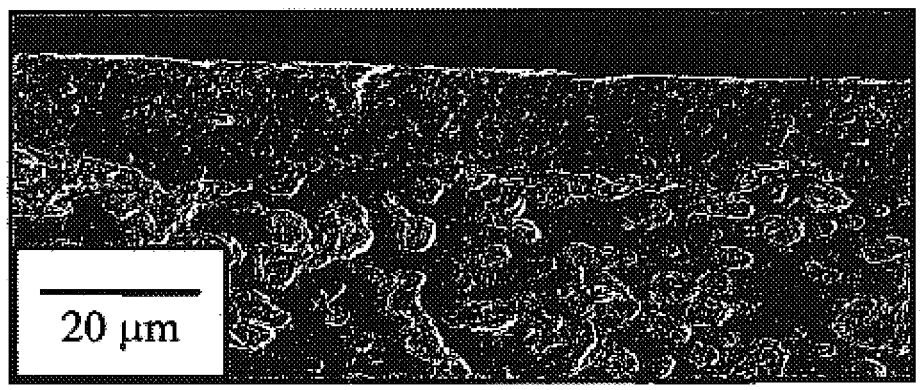
Figure 5C

CERAMIC ELECTROLYTE COATING METHODS

This invention was made with government support under Contract No. DE-FG02-96ER82236 awarded by the United States Department of Energy. The United States Government has certain rights in this invention.

FIELD OF THE INVENTION

The invention relates to a process for depositing dense coatings of a ceramic electrolyte material (e.g., yttrium-stabilized zirconia) onto porous substrates of a ceramic electrode material (e.g., lanthanum strontium manganite or nickel/zirconia) and products prepared by this process. This coating deposition process is useful in several electrochemical system applications, such as solid oxide fuel cells, ceramic oxygen generation systems, and ceramic membrane reactors. The invention also relates to processes for preparing an aqueous suspension of a ceramic electrolyte material, and an aqueous spray coating slurry including a ceramic electrolyte material.

BACKGROUND OF THE INVENTION

Ceramic oxide powders with fine particle sizes have an advantage over conventional ceramic powders in that their high surface area allows them to be densified at relatively low sintering temperatures. Their particulate nature allows them to be formed using inexpensive techniques such as dry pressing and slip casting. However, as particle size is reduced into the nanoscale range (i.e., <100 nm), the fine particle size can be problematic during ceramic processing and fabrication due to agglomeration. Agglomerates create density gradients in green ceramic compacts, resulting in inhomogeneous densification, sintering stresses and exaggerated grain growth during subsequent heat treatment.

Several methods have been demonstrated for the production of nanoscale ceramic powders, using spray pyrolysis and/or vapor condensation processes, which can result in strong aggregation of the product powder. Alternative methods, such as chemical precipitation, sol-gel, and hydrothermal synthesis processes, also result in agglomeration of the powder. Thus, suitable methods are required to achieve dispersion of nanoscale particles.

In suspension, nanoscale particles agglomerate because of short-range attractive (i.e., Van der Waals) forces. These short-range attractive forces between particles overcome the electrostatic repulsion of the electrostatic double layer that surrounds the particles. A cloud of ions and counter-ions surround the particle, creating the repulsive field. Particle-particle interactions can be manipulated by pH control. The magnitude of the particle electrostatic potential, known as the zeta potential, is controlled by the suspension pH. Increasing the zeta potential increases the repulsive force between particles. However, the effectiveness of pH adjustment is limited because adjusting pH also increases the ionic strength of the suspension. As the ionic strength of the suspension increases, the ion cloud surrounding the particle is compressed, allowing closer interparticle approach. Even at extreme values of pH, where the particle surfaces are highly charged, the compression of the ion cloud allows the particles to approach close enough for the short-range attractive forces to overcome the electrostatic repulsion, and agglomeration results.

An alternative method of dispersing ceramic powders is the addition of polymers that attach to the particle surface. The polymer coating prevents particle-particle contact, and agglomeration. Such steric hindrance methods have the disadvantage that they require complete coverage of the particle surfaces. For high surface area powders, the necessary amount of dispersant can be four times the amount of powder.

Well-dispersed nanoscale suspensions can be used in conventional slip and tape casting processes to make parts that sinter at low temperatures. Nanoscale suspensions can also be used in novel approaches, such as aerosol spraying. Functional membranes and corrosion resistant coatings can be sprayed onto substrates or parts and sintered at low temperatures. Depositing such oxide films using conventional powders requires high sintering temperatures to achieve high density. Significant interaction between the coating and the part can occur at high temperatures, in addition to grain growth; as the grains in the film grow, they push one another away, forming pinhole defects. Conventional powder particle sizes are also often near target film thicknesses, making it difficult to achieve films with good cohesion and sinterablility.

The use of suspensions of ceramic powders to produce dense and continuous coatings onto substrates using aerosol spray methods requires methods to circumvent high capillary stresses that can occur during drying. These stresses can become exceptionally high as the particle size of the ceramic particles in the deposited coating is reduced into the nanoscale regime. To avoid these stresses, modifications can be made to the starting suspension and deposited coating. The liquid/vapor interfacial energy of the solvent can be reduced, the packing density of the film can be homogenized and improved, and the strength of the interparticle bonds in the coating can be increased. Drying cracks occur during the falling rate period, where the air/solvent interface has moved into the capillaries of the coating. The adhesion of the solvent to the walls of the capillaries results in tensile forces being exerted on the film. The stress exerted can be expressed by the following formula, $$p_R = 2(\gamma_{lv} \cos \theta)/a$$

where: $p_R$=capillary pressure, $\gamma_{lv}$=liquid-vapor interfacial energy, $\theta$=solid-liquid contact angle, and a=capillary radius of curvature. From this equation and the consideration that capillary radius is directly proportional to grain size, it is evident that a film composed of nanoscale materials will suffer large drying stresses. The drying stresses from capillary pressure can be lowered by decreasing the liquid-vapor interfacial energy, using alternative solvents (e.g., alcohols), or by modifying an aqueous solvent by the addition of surfactants. Examples of surfactants include alcohols such as octanol and butanol and anionic surfactants such as alkali sulfonates, lignosulfonates, carboxolates and phosphates. Sulfonates and phosphates can leave behind inorganic components that are detrimental to sintering and the electrical properties of the fired ceramic, but organic surfactants typically do not, and are favored for ceramic applications.

Development of a successful coating process also requires good particle packing and high green strength of the applied coating. As is well described in the art, bimodal distributions pack better than unimodal distributions in the green state. Green strength of the deposited films can be improved by the addition of binders to impart a degree of plasticity to the film during drying, thus avoiding brittle fracture. Polyvinyl alcohol and methylcellulose are examples of aqueous binder systems for use in ceramics. For nanoscale systems, short chain polymers including low molecular weight starches and proteins are candidate systems.

Solid oxide fuel cells are an excellent example of an application that requires novel coating deposition technologies. Fuel cells generate power by extracting the chemical energy of natural gas and other hydrogen containing fuels without combustion. Advantages include high efficiency and very low release of polluting gases (e.g., $NO_x$) into the atmosphere. Of the various types of fuel cells, the solid oxide fuel cell (SOFC) offers advantages of high efficiency, low materials cost, minimal maintenance, and direct utilization of various hydrocarbon fuels without external reforming. Power is generated in a solid oxide fuel cell by the transport of oxygen ions (from air) through a ceramic electrolyte membrane where hydrogen from natural gas is consumed to form water. Although development of alternative materials continues, the same types of materials are used in most of the SOFC systems currently under development. The electrolyte membrane is a yttrium-stabilized zirconia (YSZ) ceramic, the air electrode (cathode) is a porous lanthanum strontium manganite (($La,Sr)MnO_3$) (LSM) ceramic, and the fuel electrode (anode) is a porous Ni-YSZ cermet. To obtain high efficiency and/or lower operating temperature, the YSZ ceramic electrolyte membrane must be dense, gas tight, and thin. This requires suitable methods for depositing electrolyte membranes as thin films onto porous electrode substrates (either the cathode or the anode).

Siemens-Westinghouse is developing tubular SOFC systems based on a porous ceramic tube with a deposited YSZ electrolyte coating, and subsequently deposited anode and interconnect coatings. These systems use electrochemical vapor deposition (EVD) to deposit 40 μm thick films of YSZ onto porous LSM cathode tubes (see A. O. Isenberg, U.S. Pat. No. 5,989,634). Gaseous zirconium and yttrium precursors are pumped through a porous LSM tube sealed within a high-temperature, high-pressure enclosure. The gaseous precursors diffuse through the pores in the LSM tube and react with air to form a dense YSZ film on the outer surface of the LSM tube. EVD creates extremely dense and high quality films. However, EVD is a batch process, and difficult to scale up. The EVD process also is capital intensive, requiring a substantial amount of highly specialized equipment and operators.

Several alternative lower cost electrolyte deposition methods, including plasma-spray, sol-gel, and colloidal deposition have been proposed and are at various stages of development. Of these, progress has been made with plasma-spray methods, although cost is still relatively high. Sol-gel methods have not been entirely successful due to difficulties in depositing films onto porous substrates and inherent film thickness limitations. Colloidal deposition methods, involving deposition of ceramic coatings by aerosol spraying or dip coating methods, with subsequent coating densification by sintering, provide inexpensive alternative routes to preparation of dense electrolyte films. The approach previously has been applied to the fabrication of electrolyte films on presintered electrode substrates that do not shrink during sintering of the coating. Prior to the present invention, it has been difficult to achieve dense electrolyte coatings of reasonable thickness (i.e., greater than a few microns) on presintered substrates, because of crack formation during the sintering step. These cracks are caused by excessive shrinkage of the coating during sintering because green densities of the deposited films are relatively low. Multiple coating deposition and sintering cycles (as many as ten coating/annealing cycles) have been applied to achieve leak tight electrolyte coatings (see for example: K. Eguchi, T. Setoguchi, S. Tamura, and H. Arai, Science and Technology of Zirconia V, pages 694–704, 1993).

An alternative to depositing electrolyte films on presintered and non-shrinking substrates is to deposit the films onto electrode substrates that do shrink during sintering of the coating (see for example: G. Blass, D. Mans, G. Bollig, R. Förthmann, and H. P. Buchkremer, U.S. Pat. No. 6,066, 364; and J. W. Kim, K. Z. Fung, and A. V. Virkar, U.S. Pat. No. 6,228,521). The fabrication of dense YSZ electrolyte coatings on porous anode (NiO/YSZ) substrates has been demonstrated using colloidal deposition and co-sintering methods. With this process, the green electrolyte coating is applied from a suspension onto a partially sintered and highly porous anode substrate and the bi-layer structure is then sintered at high temperature (typically 1400° C.). Both the substrate and coating shrink during sintering, so that cracking can be avoided and dense and leak tight electrolyte films can be produced. In these previous demonstrations of colloidal deposition processes, coating suspensions typically were produced by extensive milling of YSZ powder in a nonaqueous solvent, followed by sedimentation to remove coarse YSZ particles. The primary disadvantage of these previous approaches is high cost due to the poor yield during production of electrolyte suspensions and use of a nonaqueous solvent. A further disadvantage of these previous processes is that the colloidal YSZ suspensions have particle sizes that are larger than about 300 nm and the particulate YSZ material has relatively low surface areas (less than 20 $m^2$/gram), which results in the need for high sintering temperature (1400° C.) to densify the coatings. With such high sintering temperatures, YSZ would react adversely with the LSM cathode material during co-sintering, and the co-sintered cathode/electrolyte element would exhibit poor electrochemical performance. Thus, for the most part, the previous electrolyte coating processes can only be applied to anode substrates. There are certain advantages of depositing the electrolyte films onto porous LSM cathode substrates prior to co-sintering, which is difficult to do with existing coating methods that require high sintering temperatures. For example, raw materials cost of cathode-supported SOFC plates would be lower than those of anode-supported SOFC plates. Further, one would expect improved reliability of cathode-supported SOFC plates, due to better thermal expansion match between LSM cathode and YSZ electrolyte material, and due to failures of anode-supported plates that are associated with reduction of nickel oxide to nickel metal prior to operation (and due to the undesired re-oxidation of nickel metal to nickel oxide that can occur during shut-down after operation).

There are also advantages of applying interlayer films between the porous support electrode plate (either the LSM cathode or the NiO/YSZ anode) and the deposited electrolyte (YSZ) film. The purpose of such interlayer films could be either to increase performance (e.g. by incorporating catalytic materials that enhance electrochemical reactions or by locally reducing the size of particles and pores so that the density of electrochemical reaction sites is increased), or to prevent adverse chemical reactions between the support electrode and deposited film during sintering or co-sintering. A good example of interlayer materials include lanthanide doped cerium oxide ceramic electrolyte materials, and mixtures of ceria-based electrolytes with other materials (such as catalytic metals for anode interlayer films, and/or praseodymium manganite based perovskite ceramics for cathode interlayer films).

Accordingly, there is a need in the art for a lower cost process for colloidal deposition of dense coatings of a ceramic electrolyte material (e.g., YSZ) onto porous substrates of a ceramic electrode material (either the LSM cathode or NiO/YSZ anode) that are either presintered, partially sintered, or unsintered, and particularly a method that utilizes an aqueous coating suspension prepared with high yield, and that provides a deposited coating that can be densified with a low sintering temperature (1400° C. or lower).

SUMMARY OF THE INVENTION

The foregoing objectives are achieved in processes for preparing an aqueous suspension of a ceramic electrolyte material (e.g., YSZ), an aqueous spray coating slurry including a ceramic electrolyte material, processes for depositing dense coatings of a ceramic electrolyte material onto porous substrates of a ceramic electrode material (e.g., LSM or NiO/YSZ, or other potential electrode materials), and products prepared by this process. As used herein, "nanoscale" means a suspension of particles having a size distribution whereby >75% of the particles are less than or equal to 200 nm in size and whereby the surface area of the suspended solid material (in dry powder form) is greater than about 50 $m^2$/gram.

In one preferred embodiment, a process for preparing an aqueous suspension of a crystalline nanoscale ceramic electrolyte material includes the steps of providing an aqueous suspension of a crystalline nanoscale ceramic electrolyte material, washing the aqueous suspension, improving the dispersion of the particles in the washed suspension, classifying the dispersed suspension, and concentrating the classified suspension. The step of improving the dispersion of the particles in the washed suspension may be carried out by sonication. The step of washing the aqueous suspension may be carried out by washing with an aqueous solution containing an organic surfactant. The step of providing an aqueous suspension of a crystalline nanoscale ceramic electrolyte material may include providing a crystalline nanoscale ceramic electrolyte material prepared by hydrothermal synthesis.

In another preferred embodiment, a process for preparing an aqueous suspension of a crystalline nanoscale ceramic electrolyte material includes the steps of providing a crystalline nanoscale ceramic electrolyte material, calcining the crystalline nanoscale ceramic electrolyte material, adding water and a dispersant to the calcined ceramic electrolyte material to form an aqueous suspension, and attrition milling the aqueous suspension. The step of providing a crystalline nanoscale ceramic electrolyte material may include providing a crystalline nanoscale ceramic electrolyte material prepared by hydrothermal synthesis.

A process for preparing a ceramic electrolyte coating slurry according to the present invention includes the steps of preparing an aqueous suspension of a crystalline nanoscale ceramic electrolyte material, adding at least one water soluble additive selected from a binder and a surfactant to the aqueous suspension, and adding coarse particles of the ceramic electrolyte to the aqueous suspension. In one preferred embodiment, the step of preparing an aqueous suspension of a crystalline nanoscale ceramic electrolyte material may include providing an aqueous suspension of a crystalline nanoscale ceramic electrolyte material, washing the aqueous suspension, improving the dispersion of the particles in the washed suspension, classifying the dispersed suspension, and concentrating the classified suspension. In another preferred embodiment, the step of preparing an aqueous suspension of a crystalline nanoscale ceramic electrolyte material may include providing a crystalline nanoscale ceramic electrolyte material, calcining the crystalline nanoscale ceramic electrolyte material, forming an aqueous suspension of the calcined ceramic electrolyte material, and attrition milling the aqueous suspension. In yet another preferred embodiment, the step of preparing an aqueous suspension may include providing a crystalline nanoscale ceramic electrolyte material prepared by hydrothermal synthesis.

A process for depositing a dense coating of a ceramic electrolyte material onto a porous ceramic substrate according to the present invention includes the steps of preparing an aqueous suspension of a crystalline nanoscale ceramic electrolyte material, modifying the aqueous suspension by adding coarse particles of the ceramic electrolyte material and at least one water soluble additive selected from a binder and a surfactant, spraying the modified suspension onto the surface of a substrate such that a continuous coating approximately 10–80 microns thick is formed on the substrate upon drying of the suspension, and heating the coated substrate to form a densified ceramic electrolyte material coating approximately 5–40 microns thick. In one preferred embodiment, the step of preparing an aqueous suspension of a crystalline nanoscale ceramic electrolyte material may include providing an aqueous suspension of a crystalline nanoscale ceramic electrolyte material, washing the aqueous suspension, improving the dispersion of the particles in the washed suspension, classifying the dispersed suspension, and concentrating the classified suspension. In another preferred embodiment, the step of preparing an aqueous suspension of a crystalline nanoscale ceramic electrolyte material may include providing a crystalline nanoscale ceramic electrolyte material, calcining the crystalline nanoscale ceramic electrolyte material, adding water and a dispersant to the calcined ceramic electrolyte material to form an aqueous suspension, and attrition milling the aqueous suspension. In yet another preferred embodiment, the step of preparing an aqueous suspension of a crystalline nanoscale ceramic electrolyte material may include providing a crystalline nanoscale ceramic electrolyte material prepared by hydrothermal synthesis. The step of modifying the aqueous suspension by adding at least one water soluble additive may be carried out by adding an albumin binder. The albumin binder may be selected from crude egg albumin, purified egg albumin, and synthetic egg albumin.

The substrate may be a porous ceramic electrode material, which may be a cathode or an anode. The process may further include the step of selecting a substrate from a presintered ceramic electrode form, a partially sintered ceramic electrode form, and an unsintered ceramic electrode form.

The present invention encompasses a product formed by the process of preparing an aqueous suspension of a crystalline nanoscale ceramic electrolyte material, modifying the aqueous suspension by adding coarse particles of the ceramic electrolyte material and at least one water soluble additive selected from a binder and a surfactant, selecting a substrate from a presintered ceramic electrode form, a partially sintered ceramic electrode form, and an unsintered ceramic electrode form, spraying the modified suspension onto the surface of the substrate such that a continuous coating approximately 10–80 microns thick is formed on the substrate upon drying of the suspension, and heating the coated substrate to form a densified ceramic electrolyte material coating approximately 5–40 microns thick.

The present invention also provides a process for preparing an aqueous suspension of yttrium-stabilized zirconia particles. In one preferred embodiment, the process includes the steps of providing an aqueous suspension of crystalline nanoscale yttrium-stabilized zirconia particles, washing the aqueous suspension, improving the dispersion of the particles in the washed suspension, classifying the dispersed suspension, and concentrating the classified suspension. In another preferred embodiment, the process includes the steps of providing crystalline nanoscale yttrium-stabilized zirconia particles, calcining the crystalline nanoscale yttrium-stabilized zirconia particles, forming an aqueous suspension of the calcined yttrium-stabilized zirconia particles, and attrition milling the aqueous suspension.

A process for preparing a ceramic electrolyte coating slurry according to the present invention includes the steps of preparing an aqueous suspension of crystalline nanoscale yttrium-stabilized zirconia particles, adding at least one water soluble additive selected from a binder and a surfactant to the aqueous suspension, and adding coarse particles of the yttrium-stabilized zirconia to the aqueous suspension. In one preferred embodiment, the step of preparing an aqueous suspension of crystalline nanoscale yttrium-stabilized zirconia particles may include providing an aqueous suspension of crystalline nanoscale yttrium-stabilized zirconia particles, washing the aqueous suspension, improving the dispersion of the particles in the washed suspension, classifying the dispersed suspension, and concentrating the classified suspension. In another preferred embodiment, the step of preparing an aqueous suspension of crystalline nanoscale yttrium-stabilized zirconia particles may include providing crystalline nanoscale yttrium-stabilized zirconia particles, calcining the crystalline nanoscale yttrium-stabilized zirconia particles, forming an aqueous suspension of the calcined particles, and attrition milling the aqueous suspension. In yet another preferred embodiment, the step of preparing an aqueous suspension of crystalline nanoscale yttrium-stabilized zirconia particles may include providing crystalline nanoscale yttrium-stabilized zirconia particles prepared by hydrothermal synthesis.

A process for depositing a dense coating of a ceramic electrolyte material onto a porous ceramic substrate according tot he present invention may include the steps of preparing an aqueous suspension of crystalline nanoscale yttrium-stabilized zirconia particles, modifying the suspension by adding coarse particles of yttrium-stabilized zirconia and at least one water soluble additive selected from a binder and a surfactant, spraying the modified suspension onto the surface of a substrate such that a continuous coating approximately 10–80 microns thick is formed on the substrate upon drying of the suspension, and heating the coated substrate to form a densified ceramic electrolyte material coating approximately 5–40 microns thick. In one preferred embodiment, the step of preparing an aqueous suspension of crystalline nanoscale yttrium-stabilized zirconia particles may include providing an aqueous suspension of crystalline nanoscale yttrium-stabilized zirconia particles, washing the aqueous suspension, improving the dispersion of the particles in the washed suspension, classifying the dispersed suspension, and concentrating the classified suspension. In another preferred embodiment, the step of preparing an aqueous suspension of crystalline nanoscale yttrium-stabilized zirconia particles may include providing crystalline nanoscale yttrium-stabilized zirconia particles, calcining the crystalline nanoscale yttrium-stabilized zirconia particles, forming an aqueous suspension of the calcined particles, and attrition milling the aqueous suspension. In yet another preferred embodiment, the step of preparing an aqueous suspension of crystalline nanoscale yttrium-stabilized zirconia particles may include providing crystalline nanoscale yttrium-stabilized zirconia particles prepared by hydrothermal synthesis.

The step of modifying the aqueous suspension by adding at least one water soluble additive may be carried out by adding an albumin binder. The albumin binder may be selected from crude egg albumin, purified egg albumin, and synthetic egg albumin.

The substrate may be a porous ceramic electrode material, which may be a cathode or an anode. The process may further include the step of selecting a substrate from a presintered porous ceramic electrode form, a partially sintered porous ceramic electrode form, and an unsintered porous ceramic electrode. The step of heating the coated substrate to form a densified yttrium-stabilized zirconia coating may include heating the coated substrate until the binder is removed, calcining the coated substrate at about 900–1100° C. to strengthen the coating, and sintering the coated substrate between 1300 C and 1400° C. to densify the coating.

A process for depositing a dense coating of a ceramic electrolyte material onto a porous ceramic substrate according to the present invention may include preparing an aqueous suspension of crystalline nanoscale yttrium-stabilized zirconia particles, modifying the suspension by adding coarse particles of yttrium-stabilized zirconia and an albumin binder to the suspension, selecting a substrate from a presintered porous ceramic electrode form, a partially sintered porous ceramic electrode form, and an unsintered porous ceramic electrode, spraying the modified suspension onto the surface of a substrate such that a continuous coating approximately 10–80 microns thick is formed on the substrate upon drying of the suspension, heating the coated substrate until the binder is removed, calcining the coated substrate at about 900–1100° C. to strengthen the coating, and sintering the coated substrate between 1300 C and 1400° C. to form a densified coating approximately 5–40 microns thick.

The present invention encompasses the product formed by the process of preparing an aqueous suspension of crystalline nanoscale yttrium-stabilized zirconia particles, modifying the aqueous suspension by adding coarse particles of yttrium-stabilized zirconia and at least one water soluble additive selected from a binder and a surfactant, selecting a substrate from a presintered porous ceramic electrode form, a partially sintered porous ceramic electrode form, and an unsintered porous ceramic electrode form, spraying the modified suspension onto the surface of the substrate such that a continuous coating approximately 10–80 microns thick is formed on the substrate upon drying of the suspension, and heating the coated substrate to form a densified ceramic electrolyte material coating approximately 5–40 microns thick. The present invention also encompasses the product formed by the process of preparing an aqueous suspension of crystalline nanoscale yttrium-stabilized zirconia particles, modifying the suspension by adding coarse particles of yttrium-stabilized zirconia and an albumin binder, selecting a substrate from a presintered porous ceramic electrode form, a partially sintered porous ceramic electrode form, and an unsintered porous ceramic electrode, spraying the modified suspension onto the surface of a substrate such that a continuous coating approximately 10–80 microns thick is formed on the substrate upon drying of the suspension, heating the coated substrate until the binder is removed, calcining the coated substrate at about 900–1100° C. to strengthen the coating, and sintering the coated substrate between 1300 C and 1400° C. to form a densified coating approximately 5–40 microns thick.

The present invention further encompasses a solid oxide fuel cell formed by the process of preparing an aqueous suspension of crystalline nanoscale yttrium-stabilized zirconia particles, modifying the aqueous suspension by adding coarse particles of yttrium-stabilized zirconia and at least one water soluble additive selected from a binder and a surfactant, selecting a substrate comprising a first porous ceramic electrode material, spraying the modified suspension onto the surface of the substrate such that a continuous coating approximately 10–80 microns thick is formed on the substrate upon drying of the suspension, heating the coated substrate to form a densified ceramic electrolyte film approximately 5–40 microns thick, and depositing a layer of a second porous ceramic electrode material onto the densified ceramic electrolyte film. In one preferred embodiment, the first porous ceramic electrode material is a cathode and the second porous ceramic electrode material is an anode. In another preferred embodiment, the first porous ceramic electrode material is an anode and the second porous ceramic electrode material is a cathode.

In a preferred embodiment, the fuel cell may be formed by a process that further includes depositing an interlayer between the substrate and the ceramic electrolyte film. In another preferred embodiment, the fuel cell may be formed by a process that further includes depositing an interlayer between the ceramic electrolyte film and the second porous ceramic electrode material. In yet another preferred embodiment, the fuel cell may be formed by a process that further includes depositing a first interlayer between the substrate and the ceramic electrolyte film and depositing a second interlayer between the ceramic electrolyte film and the second porous ceramic electrode material.

From the foregoing disclosure and the following more detailed description of various preferred embodiments it will be apparent to those skilled in the art that the present invention provides a significant advance in the technology and art of ceramic coatings. Particularly significant in this regard is the potential the invention affords for lower cost colloidal deposition of dense coatings of a ceramic electrolyte material onto porous substrates of a ceramic electrode material. Additional features and advantages of various preferred embodiments will be better understood in view of the detailed description provided below.

BRIEF DESCRIPTION OF THE DRAWINGS

FIG. 3A is a plot depicting the particle size distribution of the washed crystalline yttrium-stabilized zirconia product.

FIG. 5A is an SEM micrograph of a polished cross section of a yttrium-stabilized zirconia coating deposited on a presintered LSM tubular substrate after drying of the coating at a temperature of 110° C.

FIG. 5B is an SEM micrograph of a polished cross section of a yttrium-stabilized zirconia coating deposited on a presintered LSM tubular substrate after heating the coated substrate to a temperature of 1000° C.

FIG. 5C is an SEM micrograph of a polished cross section of a yttrium-stabilized zirconia coating deposited on a presintered LSM tubular substrate after heating the coated substrate to a temperature of 1400° C.

DETAILED DESCRIPTION OF THE INVENTION

Figure 1:
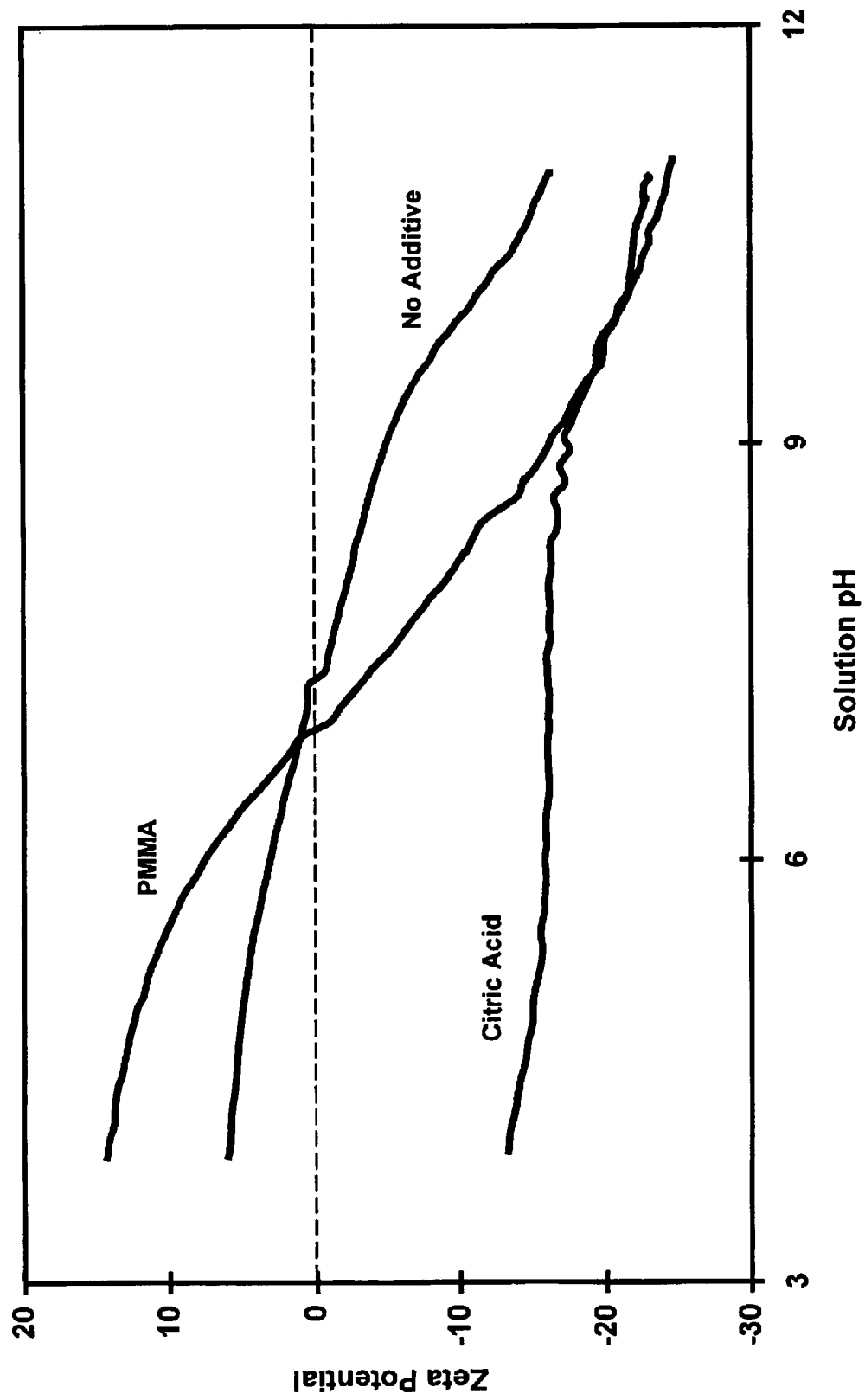
FIG. 1 is a plot showing the relationship between the zeta potential of the crystalline yttrium-stabilized zirconia product and pH, before and after the addition of dispersants.

The present invention includes processes for preparing an aqueous suspension of a nanoscale ceramic electrolyte material and aqueous coating suspensions of nanoscale ceramic electrolyte material, with yttrium-stabilized zirconia being a preferred ceramic electrolyte material. The present invention also includes processes for the deposition of a spray coating of a ceramic electrolyte material on presintered, partially sintered and unsintered ceramic substrates with yttrium-stabilized zirconia being a preferred ceramic electrolyte material, and products formed by these coating processes. The coating process yields a uniform, dense water-impermeable coating.

The examples describe preparation of nanoscale suspensions of YSZ electrolyte material, and deposition of dense YSZ coatings onto porous LSM cathode substrates, onto porous LSM cathode substrates with a micro-porous ceria-based interlayer film, and onto NiO/YSZ anode substrates. However, the disclosed processes are applicable to other combinations of ceramic electrolyte and electrode materials, for applications in solid oxide fuel cells, ceramic oxygen generation systems, gas separation systems, and ceramic membrane reactors. Example electrolyte materials include scandium oxide doped zirconia, as well as cerium oxide and lanthanide-doped cerium oxide materials. Electrode supports could vary over a range of lanthanum manganite perovskite ceramics, lanthanum ferrite perovskite ceramics, praseodymium manganite perovskite ceramics, praseodymium ferrite perovskite ceramics, or cermets of metals (nickel, cobalt, or alloys) and cerium oxide, zirconium oxide, aluminum oxide and/or titanium oxide based ceramics.

Aqueous suspensions of agglomerated, nanometer-sized yttrium-stabilized zirconia particles are prepared by hydrothermal crystallization (see for example: K. Hishinuma, M. Abe, K. Hasegawa, Z. Nakai, T. Akiba, and S. Sōmiya, Science and Technology of Zirconia V, pages 207–214, 1993; and T. Tsukada, S. Venigalla, A. A. Morrone, and J. H. Adair, Journal of the American Ceramic Society, Volume 82, pages 1169–1174, 1999). These processes involve the crystallization of zirconium-yttrium hydrous oxide precursors in a hydrothermal pressure vessel at temperatures less than 350° C. After hydrothermal reaction, the crystalline product suspension is de-agglomerated and concentrated to the desired solids content. Alternatively, a nanoscale suspension of YSZ can be obtained by drying the crystallized product, calcining the resulting powder to remove hydrous surface layers and reduce surface area, and attrition milling the powder in an aqueous solution of an appropriate surfactant (such as but not limited to, citric acid, oxalic acid or other carboxylic acids, or other suitable surfactants such as polymethyl methacrylate, etc.). This latter route can be used to obtain highly concentrated suspensions directly. These suspensions are modified by a number of novel means to allow the direct application of a coating using aerosol spray deposition processes. Examples will be provided for the deposition and sintering of dense and leak tight YSZ films onto porous and nonshrinking presintered LSM cathode substrates and for co-sintered structures comprising dense YSZ films on porous unsintered LSM cathode and NiO/YSZ anode substrates.

Aerosol coating trials conducted using the above-described nanoscale YSZ suspensions without further modification resulted in coatings that exhibited severe cracking during drying. This cracking was believed to be due to poor particle packing, low green strength of the deposited films, and because of the high surface tension caused by the use of an aqueous solvent. To improve packing density, the particle size distribution of the suspension was modified by the addition of a coarse YSZ powder. Green strength was improved by the addition of a novel binder, crude egg albumin. Other albumin binders, such as purified and synthetic egg albumin, also may be used. Superior results are obtained by adding both coarse YSZ powder and an albumin binder to the suspension, although addition of coarse YSZ powder alone may yield satisfactory results in at least some applications. Other water-soluble binders and surfactants may be added to modify the suspension for use in coatings (e.g., to reduce surface tension).

The prepared coating slurry may be sprayed onto a substrate surface (either a presintered LSM cathode tube, a partially sintered porous LSM cathode plate, or a partially sintered porous NiO/YSZ anode plate) where it dries to form a continuous coating of approximately 10 to 80 microns thick, preferably about 30–60 microns thick. The coated substrate may then be sintered at temperatures between 1250 and 1400° C. to form a densified YSZ coating having a thickness of about 5–40 microns, preferably about 10–20 microns. The high green density and high green strength of the coating slurry reduce shrinkage and resist crack formation during sintering. This allows the deposition of a coating having a thickness of at least about 5 microns in a single deposition and sintering cycle.

EXAMPLE 1

A crystalline nanoscale YSZ suspension was prepared by coprecipitation to form a hydrous zirconium-yttrium hydroxide precursor, followed by hydrothermal crystallization. The resulting nanoscale YSZ suspension had a pH of 9.62, and a conductivity of ~6 mS/cm. The surface area of the crystalline product after drying was 125 m$^2$/g. As shown on FIG. 1, the measured zeta potential of the crystalline product suspension over a range of pH values varies from negative values at high pH to positive values at low pH. The isoelectric point, or the point of zero charge, is located at a pH of 6.9. At this pH, the positive and negative charges at the particle surface balance one another completely. The absence of electrostatic charge on the particles leaves Van der Waals forces as the predominant interparticle force in the system, and results in agglomeration and sedimentation of the crystalline product particles. The zeta potential of the crystalline product can be increased dramatically by the adjustment of pH and surfactant concentration, also shown in FIG. 1. The addition of citric acid to the crystalline product suspension increases the magnitude of the zeta potential in the basic pH range and dramatically depresses the isoelectric point to a pH<3. Other dispersants (such as oxalic acid, or ammonium polymethyl-methacrylate) also can be used to modify surface charge on the nanoscale YSZ particles.

The pH of the crystalline product suspension was increased to ~10 by adding tetra-methyl ammonium hydroxide (TMAH). Then an aqueous solution of 1000 grams of $H_2O$, 22.5 grams of citric acid, and 128.5 grams of 28% TMAH was added to the suspension. The suspension was thoroughly mixed using the shear mixer and ultrasonicated at 20 kHz for 5 minutes. The resulting suspension had a pH of 10.10 and a conductivity of 8.01 mS/cm.

Figure 2:
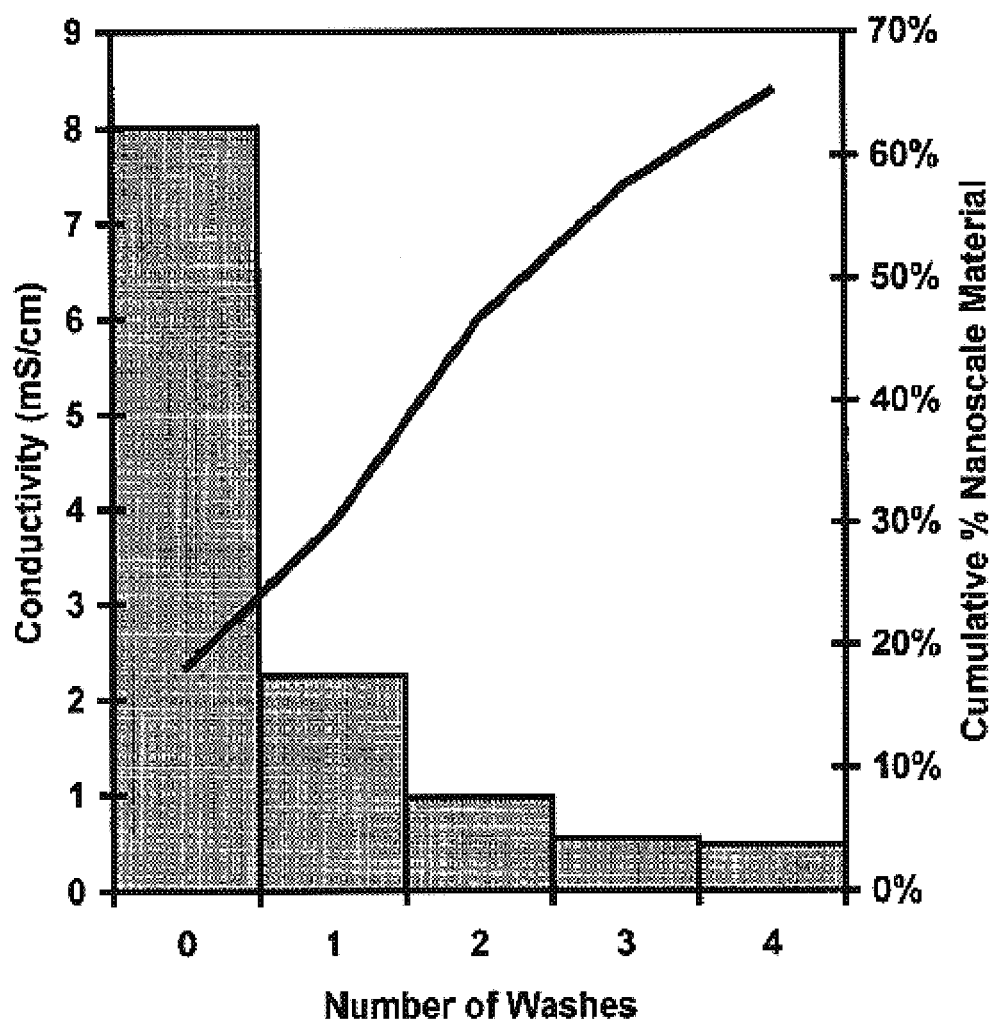
FIG. 2 is a plot showing conductivity and cumulative percent fines of the crystalline yttrium-stabilized zirconia product as a function of wash iterations.
Figure 3B:
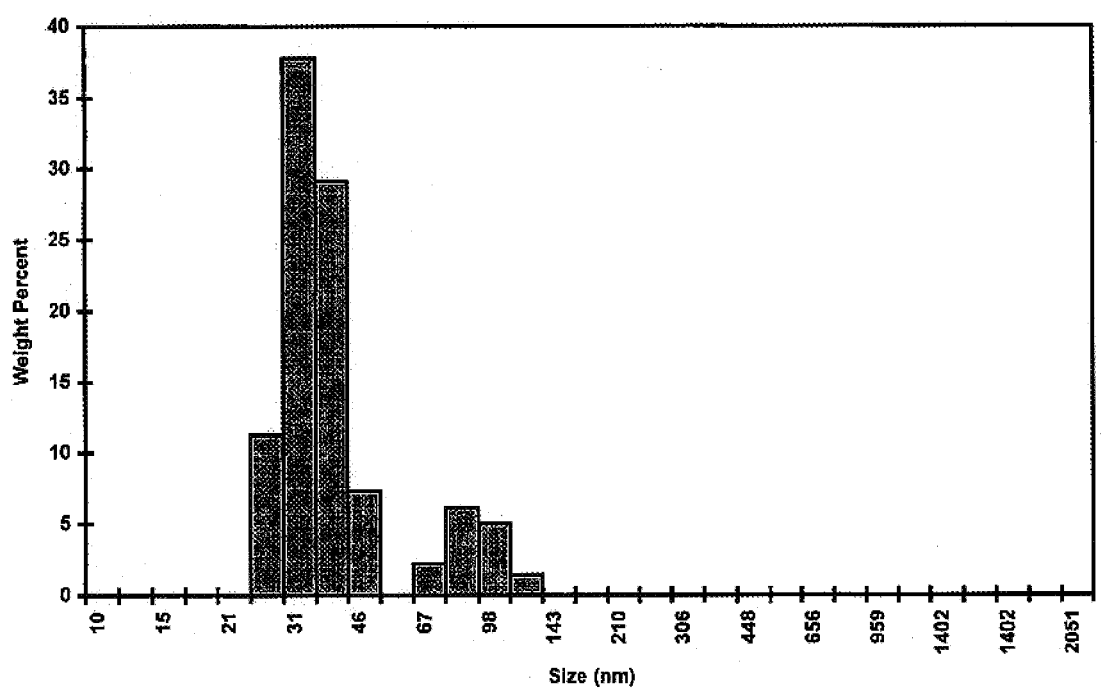
FIG. 3B is a graph depicting the particle size distribution of the condensed crystalline yttrium-stabilized zirconia product.

Centrifugation conditions were determined which would remove all material of a particle size less than 100 nm from solution. The crystalline product was ultrasonicated, and centrifuged. The resulting supernatant, containing particles <100 nm, was stored. The remaining product was again redispersed in 3600 grams of water with 5 grams of TMAH had a pH of 10.21 and a conductivity of 2.25. The lower conductivity resulted in improved dispersion of the nanoscale material, and when the centrifugation procedure was repeated, more fine material remained in the supernatant. The centrifugation and redispersion process was repeated three times and the supernatants combined and condensed. FIG. 2 shows the effect of washing on suspension conductivity, as well as the cumulative weight percent of fines collected as a fraction of the total batch weight. After this classification step, 65.2% of the material had been segregated as less than 100 nm. The coarse material was stored separately. A particle size distribution of the resulting suspension is shown in FIG. 3A. The suspensions were then concentrated using rotary evaporation. In an evacuated chamber, the suspension was held at a temperature of 40° C. while constantly stirred. Evaporated solvent was condensed and removed. The concentration was increased from the initial 5.62 wt % to 42 wt %. The particle size distribution of this condensed suspension is shown in FIG. 3B, which indicates that the particle size distribution was largely unaffected by the condensing process.

EXAMPLE 2

A bimodal spray coating slurry was prepared by first preparing an aqueous suspension comprising 91.3 grams of distilled water, 58.32 grams of YSZ powder having an average particle size of 0.2 microns and surface area of 8 m$^2$/gram (TZ-8Y) and 4.3 grams of crude egg albumin (Sigma-Aldrich). To this suspension, 32.52 grams of 42 wt % nanoscale YSZ material prepared as described in Example 1 was added. This slurry corresponds to 81 wt % coarse YSZ particles and 19 wt % nanoscale YSZ particles. After stirring and sonication, the slurry was ready for coating deposition using aerosol spray methods, as will be described in Example 3.

EXAMPLE 3

The bimodal spray slurry described in Example 2 was applied to presintered LSM cathode tubes. The tubes were 5 cm long sections of porous LSM cathode tubes (22 mm outside diameter and 1 mm wall thickness), provided by Siemens-Westinghouse. These LSM tubes had a total porosity of about 40 percent, with an average pore size of 5–10 microns. The LSM tubes were previously sintered at very high temperature. This presintering renders the LSM cathode unreactive during sintering of the YSZ coating but eliminates any cathode tube shrinkage during the film densification process. Therefore, the spray-coated film must densify (and thus shrink) on the cathode without developing cracks as the underlying cathode tube expands during the second heat treatment.

Figure 4:
FIG. 4 depicts an example of the spray coating operation and apparatus.

The spray slurry of Example 2 was sonicated prior to film deposition. Green YSZ coatings were applied to a porous LSM tube by rotating the tube around its axis and applying the slurry using an aerosol spray paintbrush, as shown in FIG. 4. The coating was applied in six iterations of 15 seconds each, with one minute in between each iteration to allow for drying. More rapid and continuous coating deposition would be possible with active heating of the substrate. The deposited coating thickness was monitored, and a coating weight corresponding to twenty microns of thickness was applied.

Figure 6:
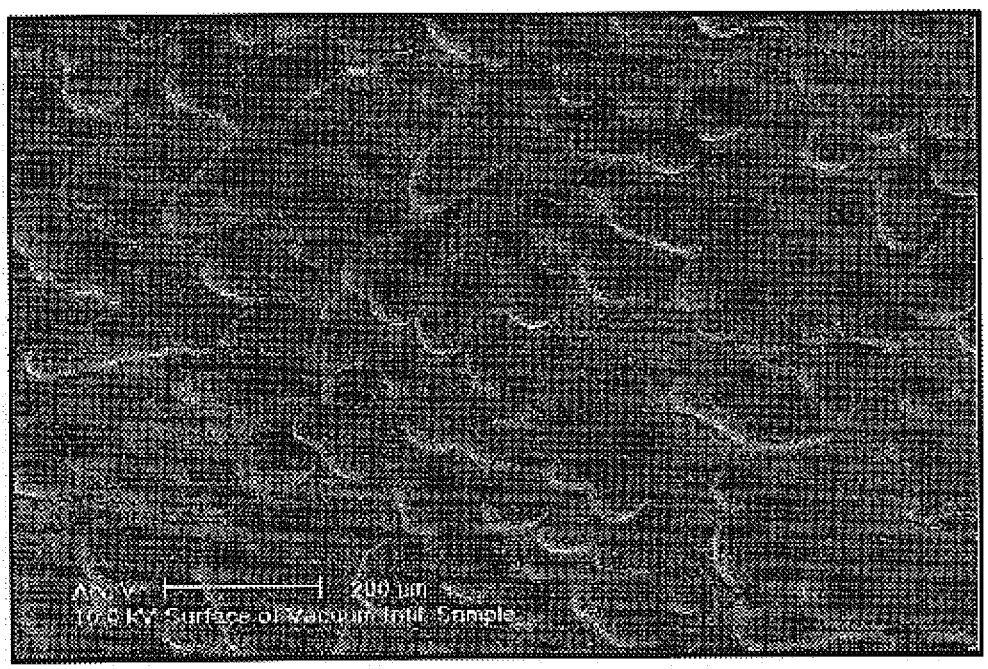
FIG. 6 is an SEM micrograph showing a top elevational view of a yttrium-stabilized zirconia coating on a tubular LSM substrate.

After deposition, the coated tubes were dried at 110° C., heated at 320° C. for one hour to remove binder, calcined at 1000° C. for one hour to strengthen the coating, and then sintered between 1300 and 1400° C. for one hour to complete densification of the coating. FIGS. 5A–C show SEM micrographs of cross sections of YSZ-coated substrates that have been dried at 110° C., calcined at 1000° C., and sintered at 1400° C., respectively. At the highest temperature, the coating has become dense and continuous. However, some cracks had developed in the YSZ electrolyte film from sintering stresses during densification. To seal these cracks, a diluted spray slurry was vacuum infiltrated into the cracks of the coating and sintered at 1400° C. for 1 hour. The resulting coating was watertight, as shown in FIG. 6.

EXAMPLE 4

To avoid many of the sintering stresses that develop when the spray slurry is applied to a presintered substrate (Example 3), the suspension can be sprayed onto a green (unsintered) and highly porous substrate and the bi-layer structure can be co-sintered. Since the substrate shrinks during sintering, stresses are reduced on the deposited film as it densities and high quality dense films on porous substrates can be obtained. The key to this approach is the preparation of a highly porous substrate that does not completely densify during co-sintering.

LSM substrates were prepared as follows: LSM powder of the composition $(La_{0.85}Sr_{0.15})MnO_3$ was first prepared: appropriate amounts of lanthanum carbonate, strontium carbonate and manganese carbonate were ball milled in isopropyl alcohol, the mixture was calcined at 1000° C. for 8 hours, and then the calcined LSM powder was attrition milled to a 1.2-micron median particle size. The LSM tape casting formulation was adapted from a literature composition: 109.9 grams of LSM powder was mixed with 12.5 grams of maltodextrin powder (Maltrin 250, Grain Processing Corporation), 2.7 grams of blown Menhaden fish oil (Tape Casting Warehouse, Z-3), 18.7 grams of xylenes (Alfa-Aesar), and 18.7 grams of ethanol. The substrate slurry was ball milled for 24 hours. The product was removed from the mill, 2.4 grams of polyvinylbutyral (B-98, Monsanto Chemical Co.) and 2.0 grams of butylbenzyl phthalate (Santicizer 160, Monsanto Chemical Co.) were added, and the substrate slurry was milled for another 24 hours. The substrate slurry was tape cast at a blade height of 1270 $\mu$m at a speed of 50 cm/min. The tape was dried for 24 hours, then cut into 2.5 cm×2.5 cm squares. The green squares were heated at 230° C. for 2 hours and 320° C. for 2 hours (to remove organics) and then calcined at 1000° C. for 1 hour.

Figure 7A:
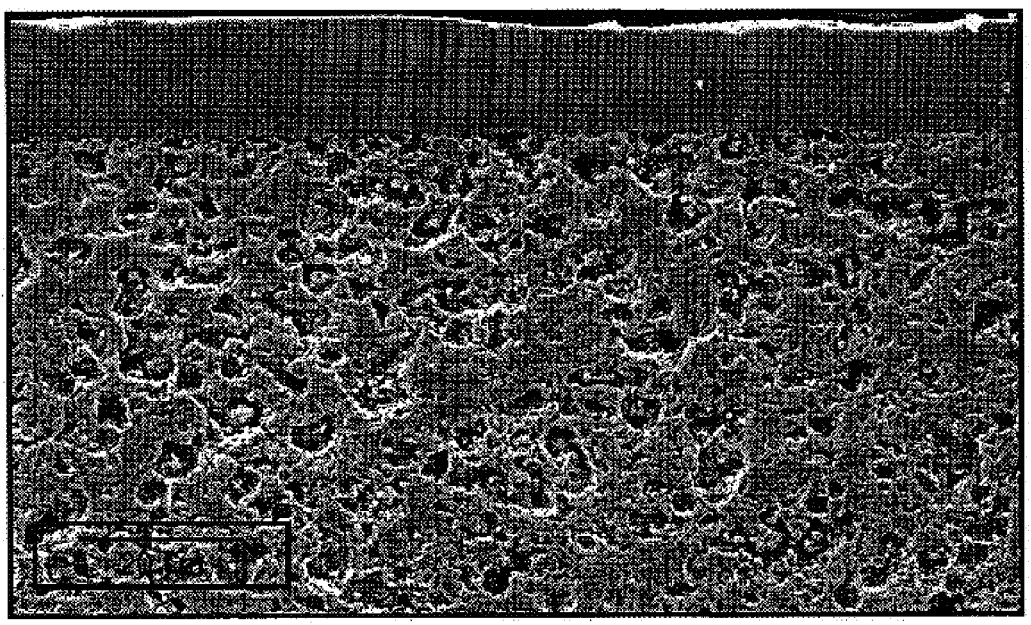
FIG. 7A is an SEM micrograph of a polished cross section of a co-sintered bi-layer element comprising a dense YSZ electrolyte film on a porous LSM cathode substrate that was co-sintered at 1350° C.

The spray coating slurry described in Example 2 was applied using an airbrush, using a turntable to keep the spray deposition even over the surface of the substrate. Approximately 0.05 grams of spray slurry was applied to each substrate. The coated samples were then heat treated at 230 and 320° C. for 2 hours at each temperature before sintering at 1350° C. for 1 hour. FIG. 7A shows the resulting microstructure. Similar to Example 3, the spray slurry coats the surface of the cathode and results in a continuous film ~40 $\mu$m thick that can then be densified to ~20 $\mu$m thick. The cathode/electrolyte bi-layer is strongly bonded and the electrolyte layer is watertight.

Figure 7B:
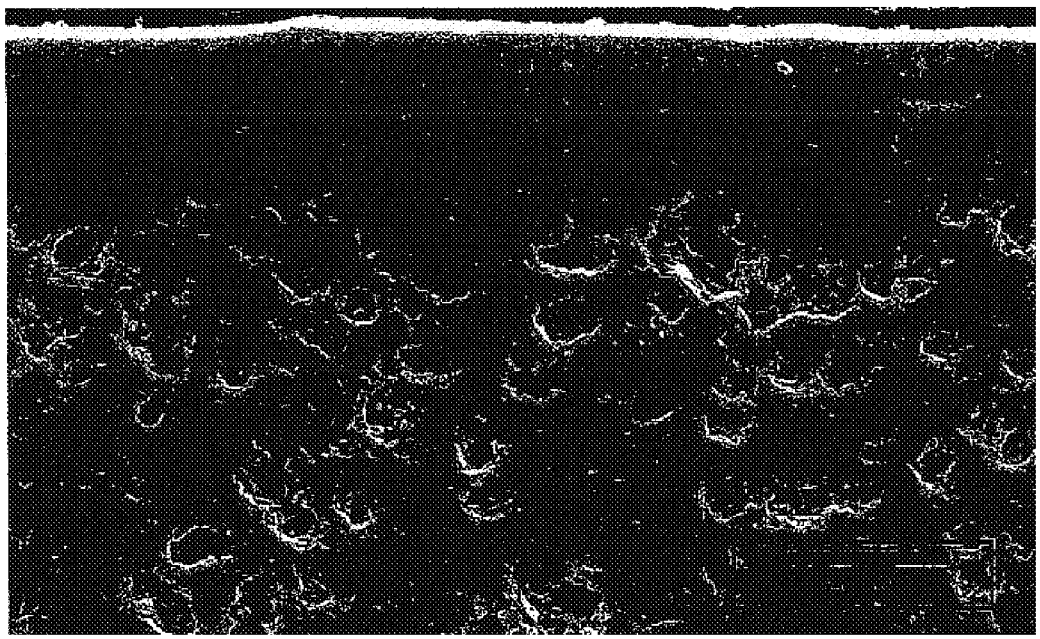
FIG. 7B is an SEM micrograph of a polished cross section of a co-sintered bi-layer element comprising a dense YSZ electrolyte film on a porous NiO/YSZ anode substrate that was co-sintered at 1350° C.

An alternative approach for SOFC fabrication is to deposit electrolyte films onto anode (NiO/YSZ) substrates and co-sintering to densify the YSZ film. The same spray slurry as described above was applied to an unsintered NiO/YSZ cermet substrate, which was made by tape casting and calcined at 800° C. The coated sample was then heat treated at 230 and 320° C. for 2 hours at each temperature before sintering at 1350° C. for 1 hour. As shown in FIG. 7B, a dense YSZ film on the porous NiO/YSZ anode substrate was achieved.

EXAMPLE 5

An alternative method for producing the nanoscale YSZ suspension is to calcine the crystalline product from the hydrothermal reaction at low temperature and to subsequently mill the product in the presence of a surfactant. This method produces highly concentrated suspensions and eliminates the need for concentrating the nanoscale suspension by rotary evaporation. Aqueous or non-aqueous solvent-dispersant systems can be used to obtain such nanoscale suspensions.

YSZ was made by the procedure documented in Example 1, with the exception that the crystallized product was centrifuged and redispersed twice in isopropyl alcohol prior to drying in a convection oven at 110° C. for eight hours. The resulting powder was then calcined in an alumina crucible at 700° C. for 4 hours to remove any residual surface species and to allow greater crystallization of the surface layers, which are known to be slightly amorphous in hydrothermally derived powders. The calcined powder had a lower surface area (72 $m^2/g$) than the original dried product (125 $m^2/g$).

Figure 8:
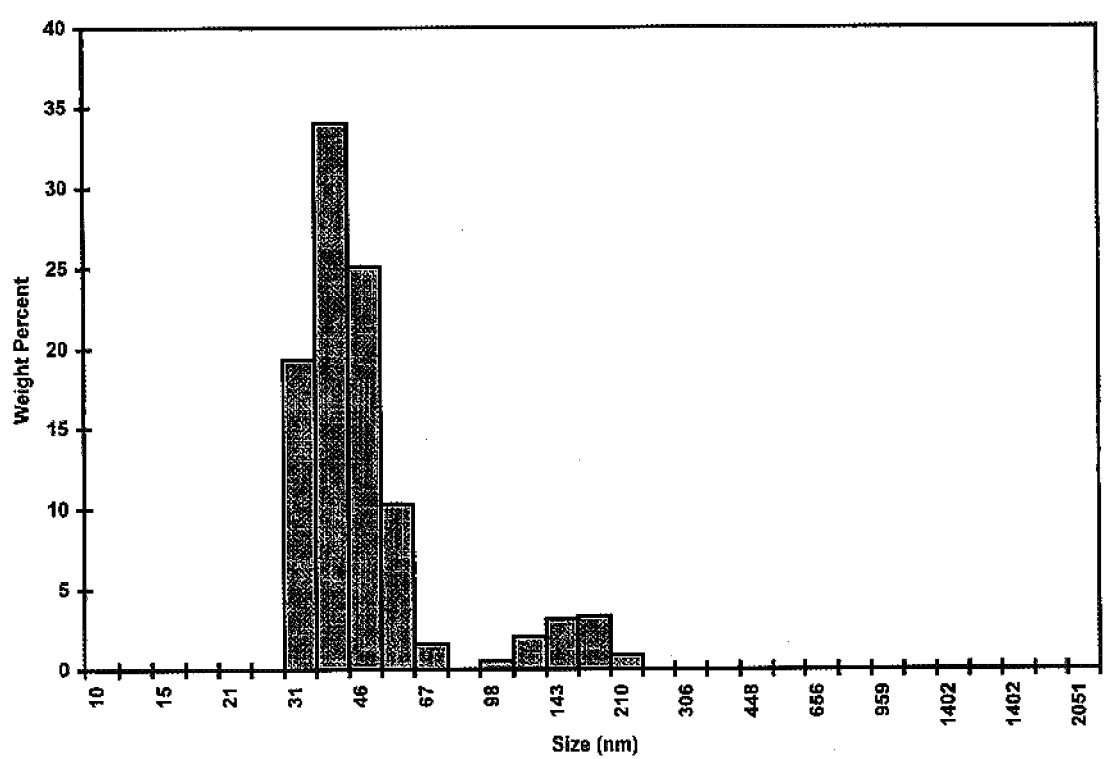
FIG. 8 is a particle size distribution for an aqueous dispersion of nanoscale yttrium-stabilized zirconia prepared by attrition milling of hydrothermally prepared and calcined YSZ powder.

650 grams of this powder was dispersed in a solution of 15.3 grams of citric acid in water that was pH adjusted to a value of 12 using TMAH. The suspension was then attrition milled for eight hours. The surface area remained nearly constant, with a final measured value of 69 m 2/g after the milling treatment. However, the particle size distribution was remarkably altered, and upon centrifugation conditions calculated to remove particles greater than 100 nm from the suspension, a supernatant containing 44.67 weight percent of yttrium-stabilized zirconia was obtained. The particle size distribution of this suspension is shown in FIG. 8.

EXAMPLE 6

Figure 9:
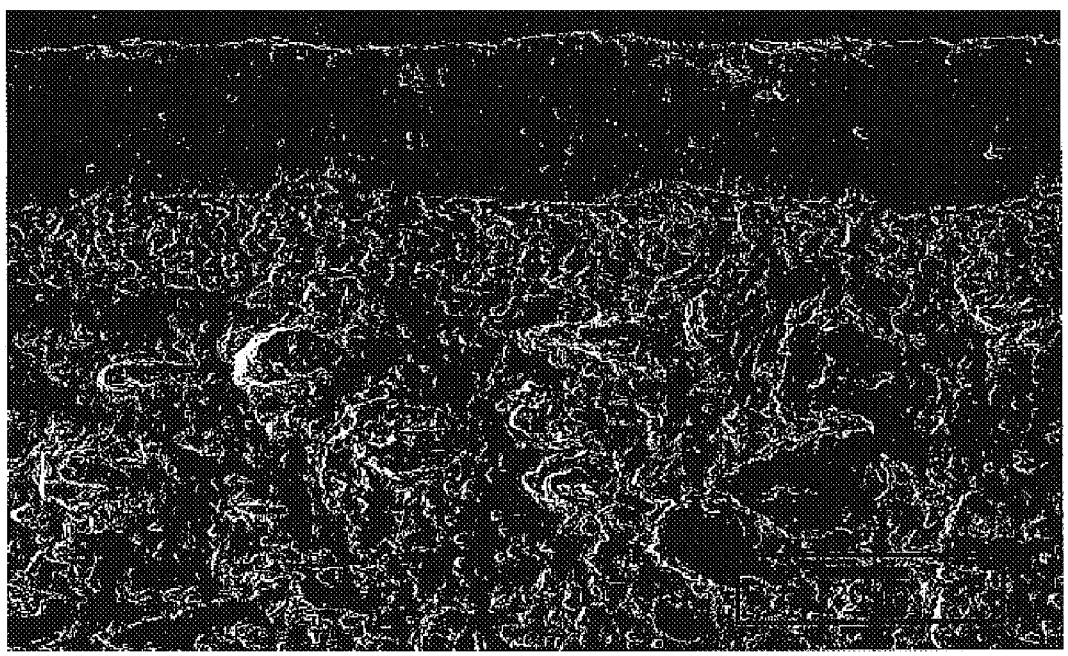
FIG. 9 is an SEM micrograph of a cross section of a co-sintered tri-layer electrolyte element with a dense yttrium-stabilized zirconia electrolyte costing and a micro-porous PSM/GDC interlayer coating deposited on a macro-porous LSM substrate.

A trilayer cathode/interlayer/electrolyte element was prepared as follows. Green LSM substrates were prepared as described in Example 4. Praseodymium strontium manganite (PSM) powder having the composition $(Pr_{0.80}Sr_{0.20})MnO_3$ was prepared: Appropriate amounts of praseodymium oxide, strontium carbonate, and manganese carbonate were ball milled for 24 hours in isopropyl alcohol, the mixture was dried and calcined at 1100° C. for four fours, and the calcined PSM powder was attrition milled to a median particle size of about 2 microns. Gadolinium-doped ceria (GDC) powder of the composition $(Ce_{0.90}Gd_{0.10})O_{1.95}$ and a particle size of approximately 2 microns was prepared by calcining a hydrothermally crystallized precursor. An interlayer suspension was prepared by adding PSM powder to the GDC suspension, so that the suspension had about 60 volume percent PSM powder, and this suspension was sonicated to disperse the PSM powder. A YSZ electrolyte coating suspension was prepared using the method described in Example 2, but using the attrition-milled YSZ suspension as the nanoscale component. The LSM substrates were first coated with a layer of the PSM/GDC interlayer suspension, and then with a coating of the YSZ electrolyte material, as described in Example 4, and likewise sintered at 1350° C. The resulting tri-layer element is presented in FIG. 9, which shows that the desired morphology consisting of a macroporous LSM substrate, a micro-porous PSM/GDC interlayer, and dense YSZ electrolyte film was achieved.

From the foregoing disclosure and detailed description of certain preferred embodiments, it will be apparent that various modifications, additions and other alternative embodiments are possible without departing from the scope and spirit of the present invention. The embodiments discussed were chosen and described to provide the best illustration of the principles of the present invention and its practical application to thereby enable one of ordinary skill in the art to use the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

What is claimed is:

1. The product formed by the process of:
   preparing an aqueous suspension of a crystalline nanoscale ceramic electrolyte material;
   modifying the aqueous suspension by adding coarse particles of the ceramic electrolyte material and at least one water soluble additive selected from a binder and a surfactant;
   selecting a substrate from a presintered ceramic electrode form, a partially sintered ceramic electrode form, and an unsintered ceramic electrode form;
   spraying the modified suspension onto the surface of the substrate such that a continuous coating approximately 10–80 microns thick is formed on the substrate upon drying of the suspension; and
   heating the coated substrate to form a densified ceramic electrolyte material coating approximately 5–40 microns thick.

2. The product formed by the process of:
   preparing an aqueous suspension of crystalline nanoscale yttrium-stabilized zirconia particles;
   modifying the aqueous suspension by adding coarse particles of yttrium-stabilized zirconia and at least one water soluble additive selected from a binder and a surfactant;
   selecting a substrate from a presintered porous ceramic electrode form, a partially sintered porous ceramic electrode form, and an unsintered porous ceramic electrode form;
   spraying the modified suspension onto the surface of the substrate such that a continuous coating approximately 10–80 microns thick is formed on the substrate upon drying of the suspension; and
   heating the coated substrate to form a densified ceramic electrolyte material coating approximately 5–40 microns thick.

3. The product formed by the process of:
   preparing an aqueous suspension of crystalline nanoscale yttrium-stabilized zirconia particles;
   modifying the suspension by adding coarse particles of yttrium-stabilized zirconia and an albumin binder;
   selecting a substrate from a presintered porous ceramic electrode form, a partially sintered porous ceramic electrode form, and an unsintered porous ceramic electrode;
   spraying the modified suspension onto the surface of a substrate such that a continuous coating approximately 10–80 microns thick is formed on the substrate upon drying of the suspension;
   heating the coated substrate until the binder is removed;
   calcining the coated substrate at about 900–1100° C. to strengthen the coating; and
   sintering the coated substrate between 1300 C and 1400° C. to form a densified coating approximately 5–40 microns thick.

4. A solid oxide fuel cell formed by the process of:
   preparing an aqueous suspension of crystalline nanoscale yttrium-stabilized zirconia particles;
   modifying the aqueous suspension by adding coarse particles of yttrium-stabilized zirconia and at least one water soluble additive selected from a binder and a surfactant;
   selecting a substrate comprising a first porous ceramic electrode material;
   spraying the modified suspension onto the surface of the substrate such that a continuous coating approximately 10–80 microns thick is formed on the substrate upon drying of the suspension;
   heating the coated substrate to form a densified ceramic electrolyte film approximately 5-40 microns thick; and
   depositing a layer of a second porous ceramic electrode material onto the densified ceramic electrolyte film.

5. The product of claim 4, wherein the first porous ceramic electrode material is a cathode and the second porous ceramic electrode material is an anode.

6. The product of claim 4, wherein the first porous ceramic electrode material is an anode and the second porous ceramic electrode material is a cathode.

7. The product of claim 4, further comprising the step of: depositing an interlayer between the substrate and the ceramic electrolyte film.

8. The product of claim 4, further comprising the step of:
   depositing an interlayer between the ceramic electrolyte film and the second porous ceramic electrode material.

9. The product of claim 4, further comprising the steps of:
   depositing a first interlayer between the substrate and the ceramic electrolyte film; and
   depositing a second interlayer between the ceramic electrolyte film and the second porous ceramic electrode material.

* * * * *